Patented Apr. 12, 1949

2,466,774

UNITED STATES PATENT OFFICE 2,466,774

PROCESS FOR PREPARING PLASTIC SUBSTANCES FROM GLYCEROL-CONTAINING FERMENTATION STILLAGE AND DICARBOXYLIC ACIDS OR ANHYDRIDES AND PRODUCTS THEREOF

David A. Legg and Morton M. Rayman, Philadelphia, Pa., assignors to Publicker Industries Inc., Philadelphia, Pa.

No Drawing. Application May 7, 1945, Serial No. 592,530

10 Claims. (Cl. 260—9)

The present invention relates to synthetic resins and processes for producing same and it relates more particularly to the production of synthetic resins from industrial fermentation residues or the like.

An object of the present invention is to provide new and useful synthetic resins and processes for producing same. Another object of the present invention is to produce synthetic resins from industrial fermentation residues. Still another object of the present invention is to utilize the stillage from the fermentation of molasses or sugary mashes to produce commercially valuable synthetic resins or the like.

Other objects and advantages of the present invention are apparent in the following detailed description and appended claims.

The industrial fermentation of carbohydrates (for example, the ethanol fermentation of molasses or other sugary mashes) produces a stillage (the residue remaining after the alcohol and other volatile materials have been distilled off from the fermented mash). This stillage has presented a serious disposal problem to the fermentation industry. Thus, it has been common practice in the past simply to dump the stillage into any nearby river or stream as the easiest way of disposing of it. However, increasing pressure by health authorities against river pollution has made it imperative to otherwise dispose of this stillage.

Accordingly, various suggestions have been made, in the past, to utilize the stillage in some concentrated form having commercial value. Suggestions made in the past have included evaporation of the stillage and ignition of the residue to obtain a fertilizer; concentration of the stillage to a syrup for use as a binder in foundry molds, etc.; concentration of the stillage for use as a dust inhibitor, an appetizer in animal feeds, etc.; and recovery of the glycerol content by superheated steam distillations, solvent extraction, etc.

While these conventional recovery processes have enjoyed some measure of popularity, they have generally been not too successful due to the fact that they involved relatively costly operations and gave end products of relatively low value.

Accordingly, the present invention contemplates a new and improved treatment of such stillage with substances capable of reacting with the constituents thereof to give synthetic resins; the treatment involving relatively simple operations and giving end products having considerable commercial value.

According to the present invention, we propose to utilize the glycerol and other resinifiable constituents of the stillage, without preliminary separation, by treating the crude concentrated or dried stillage or fermentation residue with dicarboxylic acids or their anhydrides; such as phthalic acid, tetrahydrophthalic acid, chlorotetrahydrophthalic acid, succinic acid, maleic acid, phthalic anhydride and other anhydrides, at elevated temperatures to give alkyd resins having thermoplastic and water-resistant properties.

The present process of producing resins from fermentation residues has been found to work particularly well on concentrated stillage resulting from the ethanol fermentation of invert molasses or blackstrap molasses. However, the present invention is not limited to the treatment of stillage from these particular fermentations and, instead, comprehends the similar treatment of other industrial fermentation residues; as for example, the residue from the ethanol fermentation of saccharified grains or other carbohydrates, and the residues from other fermentations (by yeasts, molds or bacteria) wherein appreciable glycerine is produced.

Generally speaking, the concentrated stillage, containing approximately 25–60% of total solids, or the completely dried stillage, is mixed with a dicarboxylic acid capable of forming synthetic resins with the glycerol and other constituents of the stillage, and the mixture is heated to cause interaction and resinification, after which the mass is cooled, powdered and extracted with water to remove undesirable water-soluble constituents, after which the washed material is dried, mixed with any suitable filler, and heated at elevated temperatures and pressures to give a plastic composition of considerable strength and water resistance. If water resistance is not an essential property of the final product, the washing step may be omitted.

Stillage from invert molasses fermentation contains approximately 3–4% of total solids which, on a dry basis, contains approximately 10–15% of protein (calculated as $N \times 6.25$), 12–15% of ash, 15–30% of glycerol and 63–40% of non-volatile acids (such as lactic and succinic acids and the sugar acids) and residual carbohydrates. When continuous 100% backslopping (that is, using only stillage plus molasses in making up fresh mash) is employed, the concentration of solids in invert molasses stillage can be built up to approximately 9%; these solids containing approximately 25% glycerol on a dry basis.

When the concentrated stillage is treated with one of the acids or anhydrides enumerated above, the resin formed contains substantially all the glycerol content of the stillage and also contains a large part of the nitrogen content of the stillage as well as a considerable part of the other constituents.

The following are illustrative, but not restrictive examples of the invention:

Example 1

Concentrated stillage, containing approximately 40–60% of total solids, is mixed with phthalic anhydride in the ratio of approximately 1 to 2.5 mols of phthalic anhydride per mol of the estimated glycerol; a ratio of approximately 1.5:1.0 being preferred. The mass is then heated to a temperature between 150 and 230° C. for a period up to three hours or more, depending upon the desired stability of the final product; heating at a low temperature for a short time tending to give a more thermoplastic material having relatively low water resistance, while heating at a high temperature for a long time will give a less thermoplastic material having a high water resistance. The mass is then cooled, powdered and extracted with water to remove the water-soluble constituents (which interfere with the water resistance of the final product) after which the washed material is dried. The dried resin may then be mixed with a filler, as for example, wood flour, and may be heated at temperatures up to 230° C. or more and pressures up to 2000 pounds per square inch or more to obtain a plastic composition having considerable strength and water resistance.

If water resistance is not important in the final product, the washing step may be omitted.

Example 2

1500 parts of concentrated stillage from the ethanol fermentation of invert molasses, containing approximately 858 parts of solids equivalent to 196.5 parts of glycerol, was mixed with 468 parts of phthalic anhydride and heated with occasional stirring to approximately 165° C. for 1½ hours. 100 parts of the cooled resinous mass was powdered and extracted with cold water, leaving 48 parts of crude resin. Samples of the washed and of the unwashed resin were mixed in the dry state with fine sawdust in the ratio of 60 parts by weight of resin and 40 parts by weight of sawdust, the mixture being subjected to a pressure of 2000 pounds per square inch at a temperature of approximately 185° C. in a molding press. Both the washed and unwashed resins gave good bonding effects; the final resin having considerable strength when subjected to conventional tests. The washed resin was found to have better water resistance than the unwashed resin.

Example 3

1500 parts of concentrated stillage, containing approximately 855 parts of solids, including approximately 153 parts of glycerol, was mixed with approximately 460 parts of monochlortetrahydrophthalic anhydride and was heated between 170 and 200° C. for approximately 1 hour. After cooling, the powdered material was extracted with cold water to give a yield of approximately 1050 parts of insoluble resin. After drying, the resin was molded under pressure of 2000 pounds per square inch at a temperature of approximately 210° C. both with and without a filler. The resultant products had good water resistance and also had considerable strength when used with an appropriate filler.

Example 4

Concentrated stillage obtained from an ethanol fermentation was mixed with phthalic anhydride in the ratio of approximately 1.5 mols of phthalic anhydride to 1 mol of the estimated glycerol content of the stillage. The mixture was heated at approximately 175° C. for approximately 2 hours after which the mass was cooled, powdered and extracted with cold water. The washed residue was mixed with wood flour and molded at approximately 200° C. at a pressure of approximately 2000 pounds per square inch to give a resinified product of good water resistance and considerable strength when molded with an appropriate filler.

Example 5

The procedure of Example 4 was repeated using tetrahydrophthalic acid with comparable results.

Example 6

The procedure of Example 4 was repeated using chlorotetrahydrophthalic acid with comparable results.

We have found that the final product obtained, when stillage is treated according to the present process, differs in properties from that obtained when pure glycerol is similarly treated; it being modified by the nitrogenous and other constituents of the stillage.

The resinification can be modified in any of the ways well known in the art; as for example, by the addition of suitable modifiers, plasticizers, accelerators, etc.

In general, we have found that substances capable of combining with glycerol to form a resinous material are satisfactory in treating stillage to form a plastic substance in accordance with the present invention.

The elevated temperatures and pressures employed in forming the plastic substances of the present invention are those generally known in the art and employed in connection with conventional resin-forming reactions involving polyhydric alcohols and polybasic acids.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described the invention, what we claim as new and desire to protect by Letters Patent, is:

1. A process for preparing a plastic substance which comprises mixing a member of the group consisting of dicarboxylic acids and their anhydrides with a concentrated stillage from a glycerine-producing fermentation, said stillage containing on a dry basis approximately 10–15% of protein (calculated as N×6.25), 12–15% of ash, 15–30% of glycerol and 63–40% of non-volatile acids and residual carbohydrates, said mixture containing approximately 1 to 2.5 mols of the dicarboxylic acid or anhydride per mol of glycerol, and heating the mixture at about 150–230° C. for approximately 1 to 3 hours.

2. A plastic substance comprising the product formed by the process set forth in claim 1.

3. A process according to claim 1 wherein the first constituent is phthalic anhydride.

4. A plastic substance comprising the product formed by the process set forth in claim 3.

5. A process according to claim 1 wherein the first constituent is monchlorotetrahydrophthalic anhydride.

6. A plastic substance comprising the product formed by the process set forth in claim 5.

7. A process according to claim 1 wherein the first constituent is tetrahydrophthalic anhydride.

8. A plastic substance comprising the product formed by the process set forth in claim 7.

9. A process for preparing a plastic substance which comprises the steps of mixing approximately 1500 parts of concentrated stillage from an ethanol fermentation of invert molasses containing approximately 858 parts of solids including approximately 196.5 parts of glycerol, with approximately 468 parts of phthalic anhydride, and heating the mixture and occasionally stirring to approximately 165° C. for approximately 1½ hours.

10. A plastic substance formed by the process set forth in claim 9.

DAVID A. LEGG.
MORTON M. RAYMAN.

REFERENCES CITED

The following references are of record in the file of this patent:

Kienle et al. Ind. Eng. Chem., vol. 21, page 349–352 Apr. 1929.